United States Patent [19]

Flotow et al.

[11] Patent Number: 5,031,739
[45] Date of Patent: Jul. 16, 1991

[54] TWO PIECE CLUTCH BRAKE

[75] Inventors: Richard A. Flotow, Butler; Jerry L. Rathburn, Auburn; James K. Tarlton, Jr., Garrett; Martin E. Kummer, Auburn, all of Ind.

[73] Assignee: Dana Corporation, Toledo, Ohio

[21] Appl. No.: 372,057

[22] Filed: Jun. 27, 1989

Related U.S. Application Data

[63] Continuation-in-part of Ser. No. 350,592, May 11, 1989, abandoned.

[51] Int. Cl.⁵ .................................. F16D 67/02
[52] U.S. Cl. .............................. 192/13 R; 192/70.13
[58] Field of Search .................... 192/13 R, 70.13

[56] References Cited

U.S. PATENT DOCUMENTS

| 357,095 | 2/1887 | Potts | 192/70.24 |
|---|---|---|---|
| 381,151 | 4/1888 | Mahoney | 403/362 |
| 542,166 | 7/1895 | Lorah | 474/96 |
| 553,525 | 1/1896 | Hankin | 403/7 |
| 554,431 | 2/1896 | White | 411/539 |
| 555,512 | 3/1896 | Johnson | 403/362 |
| 698,112 | 4/1902 | Hall | 192/70.2 |
| 713,227 | 11/1902 | Levalley | 403/344 |
| 727,707 | 5/1903 | Stauffer et al. | 403/344 |
| 776,224 | 11/1904 | Dickey | 192/67 R |
| 1,203,484 | 10/1916 | Carter | 192/80 |
| 1,550,279 | 8/1925 | Petrasek | 192/18 R |
| 1,991,569 | 2/1935 | Nickles | 192/70.13 |
| 2,143,005 | 1/1939 | Green | 248/413 |
| 2,765,881 | 10/1956 | Pierce | 188/218 A |
| 2,863,537 | 12/1958 | Root | 192/13 R |
| 2,869,688 | 1/1959 | Busch | 188/218 X |
| 3,105,579 | 10/1963 | Moore et al. | 192/13 R |
| 3,202,247 | 8/1965 | Schmidt et al. | 192/13 R |
| 3,435,924 | 4/1969 | Beuchle | 192/107 R |
| 3,626,540 | 12/1971 | Rood | 15/210 |
| 3,763,977 | 10/1973 | Sink | 192/13 R |
| 3,809,192 | 5/1974 | Stehle | 192/107 R |
| 4,043,437 | 8/1977 | Taylor | 192/13 R |
| 4,046,237 | 9/1977 | Root et al. | 192/13 R |
| 4,186,826 | 2/1980 | MacKendrick et al. | 192/13 R |
| 4,199,044 | 4/1980 | Ivens et al. | 192/70.13 |
| 4,449,621 | 5/1984 | F'Geppert | 192/70.13 |
| 4,474,268 | 10/1984 | Dayen | 188/71.5 |
| 4,512,450 | 4/1985 | Babcock | 192/12 R |
| 4,727,970 | 3/1988 | Reik et al. | 192/70.17 |
| 4,756,392 | 7/1988 | McMurray | 192/107 R |

FOREIGN PATENT DOCUMENTS 2119879 11/1983 United Kingdom .
2136070 9/1984 United Kingdom .

Primary Examiner—Allan D. Herrmann
Assistant Examiner—Nicholas Whitelaw
Attorney, Agent, or Firm—MacMillan, Sobanski & Todd

[57] ABSTRACT

A clutch brake is formed from a pair of identically shaped semi-annular halves. One end of each of the halves is formed with a first circumferentially extending protrusion located near the outer circumferential edge thereof. Each of the opposite ends of the halves is formed with a second circumferentially extending protrusion located near the inner circumferential edge thereof. The outer protrusions are disposed adjacent to the inner protrusions in circumferentially overlapping fashion. A pair of radially extending threaded fasteners are used to secure the two clutch brake halves together. The threaded fasteners extend radially through aligned apertures formed in the overlapping outer and inner protrusions. The radially innermost ends of the threaded fasteners extend a sufficient distance so as to engage splines formed on a transmission input shaft upon which the clutch brake is mounted. Notches are formed on the outer surfaces of each of the clutch brake halves to easily position a chisel or similar tool to fracture the two halves when it is desired to remove the clutch brake from the shaft. A plurality of apertures may be formed through and a plurality of recessed areas of reduced thickness may be formed in each of the semi-annular halves to reduce the weight of the clutch brake.

32 Claims, 2 Drawing Sheets

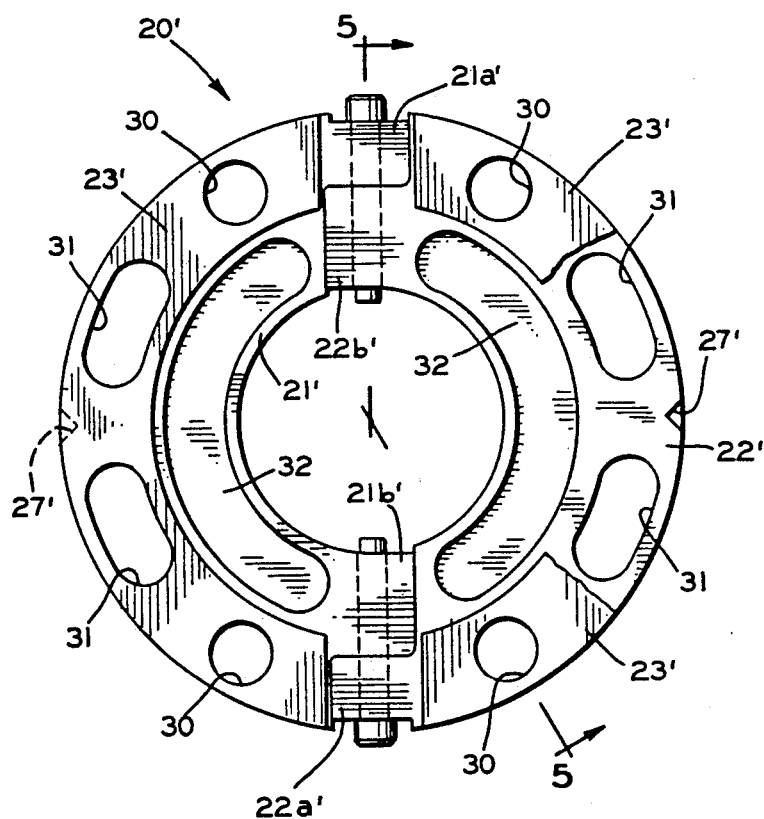
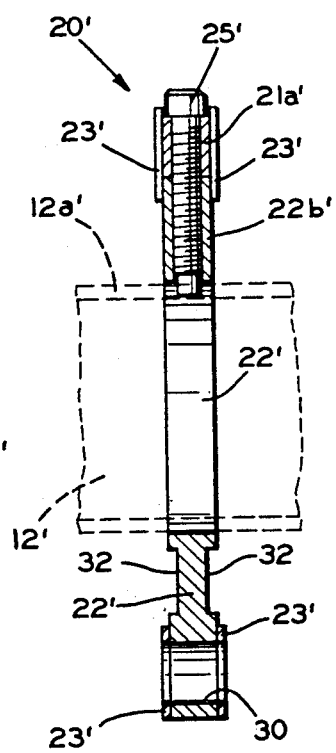
FIG. 4
FIG. 5

TWO PIECE CLUTCH BRAKE

CROSS REFERENCE TO RELATED APPLICATION

This application is a continuation-in-part of application Ser. No. 07/350,592, filed May 11, 1989, now abandoned.

BACKGROUND OF THE INVENTION

This invention relates in general to friction clutches and transmissions for vehicles and in particular to an improved structure for a clutch brake adapted for use with such clutches and transmissions.

In vehicular drive trains, it is well known to utilize a friction clutch to selectively disconnect an engine from a transmission in order to permit the transmission to perform a gear shifting operation. Prior to such a gear shifting operation, gears to be mated together within the transmission are driven by the engine at different rotational speeds. The clutch is disengaged so that the mating gears are not continued to be driven by the engine and, therefore, can be aligned with one another prior to the gear shifting operation. This pre-shifting alignment prevents undesirable clashing of the gear teeth. However, in a non-synchronized transmission, the rotating shaft which connects the clutch to the transmission continues to rotate for a period of time after the clutch has been disengaged because of momentum and clutch drag. Thus, in such non-synchronized transmissions, it is necessary to provide some means for slowing or stopping the rotation of this transmission input shaft when the clutch is disengaged to permit the alignment of the gears as described above.

The clutch brake is a device which is well known in the art for slowing or stopping the rotation of the transmission input shaft when the clutch is disengaged. Being generally flat and annular in shape, the clutch brake is disposed about the transmission input shaft between the rearward end of a release bearing for the clutch and the forward end of the transmission. Typically, the clutch brake is splined onto the transmission input shaft so as to rotate therewith, while being movable axially therealong. The release bearing is also mounted about the transmission input shaft for axial movement therealong.

Normally, the release bearing moves between engaged (near the clutch) and disengaged (near the transmission) positions for causing the clutch to selectively connect and disconnect the transmission input shaft from the engine. When so moved, the clutch brake is not engaged by the release bearing and, consequently rotates freely with the transmission input shaft. However, when it is desired to slow or stop the rotation of the transmission input shaft, the release bearing may be moved beyond the disengaged position further toward the transmission. When so moved, the clutch brake is frictionally engaged between the release bearing and the forward end of the transmission. As a result, rotation of the clutch brake, as well as of the transmission input shaft, is slowed or stopped.

Because they are relatively small in size, and further because they are frequently subjected to large torsional forces during use, clutch brakes generally have shorter service lives than the clutches or transmissions with which they are used. Thus, it is often necessary to replace a worn clutch brake without otherwise servicing the clutch or transmission. In the past, most clutch brakes have been formed as an annular metallic assembly. Because of its annular shape, such a prior clutch brake could be replaced only by partially disassembling the clutch or transmission so as to free one end of the shaft upon which the clutch brake was mounted, thereby allowing the clutch brake to slide off. More recently, clutch brakes have been formed from two mating halves secured about the shaft. Clutch brakes of this type can be removed and installed without partially disassembling the clutch or transmission. However, such clutch brakes have relatively complicated in structure and sometimes difficult to remove from the shaft.

SUMMARY OF THE INVENTION

This invention relates to an improved structure for a clutch brake which can be easily installed and removed from a shaft extending between a clutch and transmission. The clutch brake includes a pair of identically shaped semi-annular halves. One end of each of the halves is formed with a first circumferentially extending protrusion located near the outer circumferential edge thereof. Each of the opposite ends of the halves is formed with a second circumferentially extending protrusion located near the inner circumferential edge thereof. The outer protrusions of the clutch brake halves are disposed adjacent to the inner protrusions in circumferentially overlapping fashion. A pair of radially extending threaded fasteners are used to secure the two clutch brake halves together. To accomplish this, the threaded fasteners extend radially through aligned apertures formed in the overlapping outer and inner protrusions. The radially innermost ends of the threaded fasteners extend a sufficient distance so as to engage splines formed on the shaft. Consequently, the clutch brake is supported on the shaft for rotation therewith and axial movement therealong. Notches are formed on the outer surfaces of each of the clutch brake halves to easily position a chisel or similar tool to fracture the two halves when it is desired to remove the clutch brake from the shaft. Respective pluralities of apertures and recessed areas of reduced thickness may be formed in each of the semi-annular halves to reduce the weight of the clutch brake.

It is an object of this invention to provide an improved structure for a clutch brake.

It is another object of this invention to provide such a clutch brake structure which is simple and inexpensive to manufacture, install, and remove.

Other objects and advantages of this invention will become apparent to those skilled in the art from the following detailed description of the preferred embodiment, when read in light of the accompanying drawings.

BRIEF DESCRIPTION OF THE DRAWINGS

FIG. 4 is an end elevational view similar to FIG. 2 showing an alternate embodiment of this invention.

FIG. 5 is a sectional elevational view taken along line 5—5 of FIG. 4.

DETAILED DESCRIPTION OF THE PREFERRED EMBODIMENT

Figure 1:
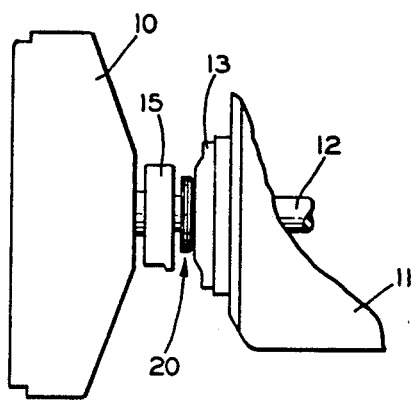
FIG. 1 is a side elevational view schematically illustrating a clutch and transmission for a vehicle including a clutch brake in accordance with this invention.

Referring now to FIG. 1, there is schematically illustrated a conventional pull-to-release type friction clutch 10 which is adapted for use with a conventional non-synchronized transmission 11. As is well known, the clutch 10 includes a cover assembly which is continuously rotated by an engine (not shown). Means are provided within the clutch 10 for selectively connecting the cover assembly to a transmission input shaft 12 extending between the clutch 10 and the transmission 11. The transmission input shaft 12 is supported at its forward end by a bearing (not shown) located within the clutch 10 and at its rearward end by a bearing 13 mounted in the forward wall of the transmission 11. The transmission input shaft 12 has a plurality of splines 12a (see FIG. 3) formed thereon.

A conventional clutch release bearing 15 is slidably disposed about the transmission input shaft 12. The release bearing 15 is axially movable along the transmission input shaft 12 and normally moves between an engaged position (located near the clutch 10) and a disengaged position (located near the bearing 13 mounted in the forward wall of the transmission 11). The release bearing 15 may be moved by means of a conventional clutch pedal and associated linkage (not shown). When the release bearing 15 is in the engaged position, the clutch 10 connects the rotating cover assembly to the transmission input shaft 12 for rotation together. When the release bearing 15 is in the disengaged position, the clutch 10 disconnects the rotating cover assembly from the shaft 12, allowing the shaft 12 to rotate freely.

A clutch brake, indicated generally at 20, is mounted on the shaft 12 between the release bearing 15 and the transmission bearing 13. As will be explained in greater detail below, the clutch brake 20 engages the splines 12a formed on the shaft 12 so as to rotate with the shaft 12, while being axially movable therealong. The general function of the clutch brake 20 is well known in the art. When the release bearing 15 is moved between the engaged and disengaged positions, the clutch brake 20 is not engaged by the release bearing 15 and, consequently rotates freely with the transmission input shaft 12. However, when it is desired to slow or stop the rotation of the transmission input shaft 12, the release bearing 15 may be moved beyond the disengaged position further toward the transmission 11. When so moved, the clutch brake 20 is frictionally engaged between the release bearing 15 and the forward end of the transmission 11. As a result, rotation of the clutch brake 20, as well as of the transmission input shaft 12, is slowed or stopped.

Figure 2:
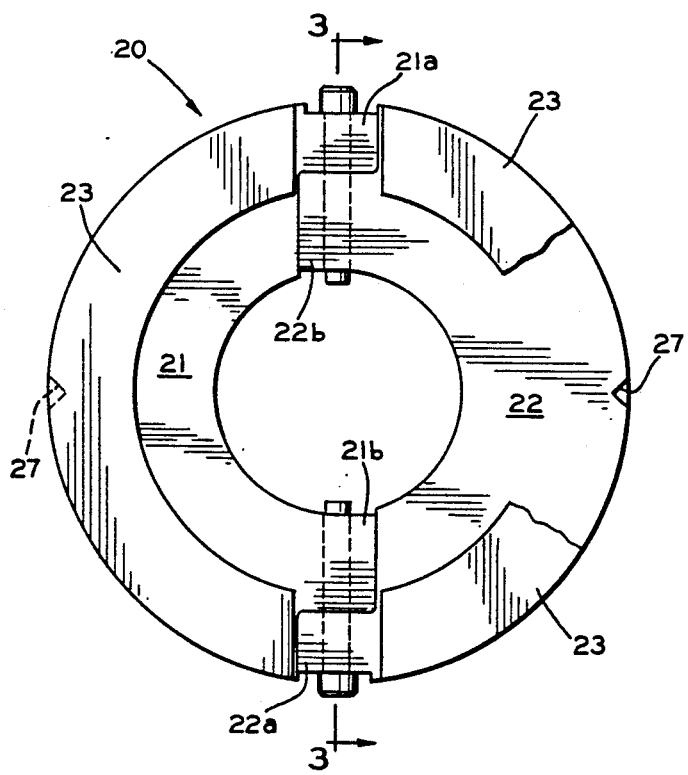
FIG. 2 is an end elevational view, partially broken away, of clutch brake illustrated in FIG. 1.
Figure 3:
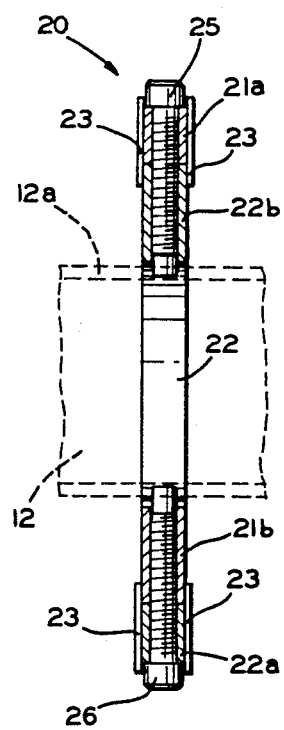
FIG. 3 is a sectional elevational view taken along line 3—3 of FIG. 2.

Referring now to FIGS. 2 and 3, the structure of the clutch brake 20 is illustrated in detail. As shown therein, the clutch brake 20 includes a pair of mating halves 21 and 22. The first clutch brake half 21 is generally formed in the shape of a semi-annulus. One end of the first clutch brake half 21 is formed with a first circumferentially extending protrusion 21a located near the outer circumferential edge thereof. The opposite end of the first clutch brake half 21 is formed with a second circumferentially extending protrusion 21b located near the inner circumferential edge thereof. The second clutch brake half 22 is formed identical to the first clutch brake half 21, including first and second circumferentially extending protrusions 22a and 22b.

The protrusions 21a, 21b, 22a, and 22b are sized such that the inner circumferential surface of the outer protrusion 21a is disposed adjacent to the outer circumferential surface of the inner protrusion 22b in circumferentially overlapping fashion, as best shown in FIG. 2. Similarly, the inner circumferential surface of the outer protrusion 22a is disposed adjacent to the outer circumferential surface of the inner protrusion 21b in circumferentially overlapping fashion. A flat semi-annular friction facing 23 is attached to both sides of each of the brake halves 21 and 22.

To secure the two clutch brake halves 21 and 22 together, a pair of radially extending threaded fasteners 25 and 26 are used. The first threaded fastener 25 extends through aligned radially extending apertures formed in both the outer protrusion 21a of the first clutch brake half 21 and the inner protrusion 22b of the second clutch brake half 22, as best shown in FIG. 3. Similarly, the second threaded fastener 26 extends through radially extending aligned apertures formed in both the outer protrusion 22a of the second clutch brake half 22 and the inner protrusion 21b of the first clutch brake half 21. As will be further explained below, the apertures formed through the outer protrusions 21a and 22a are preferably non-threaded bores, while the apertures formed through the inner protrusions 21b and 22b are threaded so as to engage the fasteners 25 and 26.

To install the clutch brake 20 on the shaft 12, the halves 21 and 22 are initially arranged as shown in FIG. 2 such that they surround the shaft 12. In this position, the apertures formed through the outer protrusions 21a and 22a are radially aligned with the apertures formed through the inner protrusions 21b and 22b. Then, the fasteners 25 and 26 are inserted through the apertures formed through the outer protrusions 21a and 22a and threaded into the apertures formed through the inner protrusions 21b and 22b. The fasteners 25 and 26 include enlarged head portions which, when tightened, clamp the outer protrusions 21a and 22a against the inner protrusions 21b and 22b, thereby securing the clutch brake halves 21 and 22 together. When the threaded fasteners 25 and 26 have been installed in this manner, the radially innermost ends of thereof extend into cooperation with the splines 12a formed on the shaft 12, as shown in FIG. 3. Consequently, the clutch brake 20 rotates together with the shaft 12, while being axially movable therealong.

When the clutch brake 20 is frictionally engaged as described above, the inner ends of the threaded fasteners 25 and 26 are subjected to shearing forces because of their cooperation with the splines 12a. As mentioned above, the threaded fasteners 25 and 26 are secured to the threaded apertures formed through the inner protrusions 21b and 22b. Thus, the threaded fasteners 25 and 26 are connected to the clutch brake halves 21 and 22 immediately adjacent to the outer surface of the transmission input shaft 12. This structure is desirable because it reduces the amount of torque applied to the inner ends of the threaded fasteners 25 and 26 when the clutch brake 20 is frictionally engaged. Since the threaded fasteners 25 and 26 provide the sole driving connection between the transmission input shaft 12 and the clutch brake 20, it is important to reduce the stresses imposed on the inner ends thereof so as to extend their service life.

When it is desired to remove the clutch brake 20 from the shaft 12, the threaded fasteners 25 and 26 are loosened and removed, thereby allowing the two clutch brake halves 21 and 22 to be separated without disassembling the shaft 12 from the clutch 10 or the transmission 11. In some instances, however, the threaded fasteners 25 and 26 may resist being removed from engagement with the clutch brake halves 21 and 22. To simplify the removal process, a notch 27 is formed in the outer circumferential surface of each of the clutch brake halves 21 and 22. These notches 27 are provided as a locating means for a chisel (not shown) or similar tool to be inserted therein. By striking a radially directed blow with such a tool, it has been found that the clutch brake halves 21 and 22 will fracture radially inwardly to the inner circumferential surface. By fracturing the clutch brake halves 21 and 22 in this manner, the worn clutch brake 20 can be quickly and easily removed from the shaft 12. A new clutch brake 20 can then be mounted on the shaft 12 in the manner described above.

As mentioned above, when the clutch release bearing 15 is moved to the engaged position, the shaft 12 is connected through the clutch 10 to the engine for rotation. During such engagement, the clutch brake 20 rotates freely with the shaft 12. However, the shaft 12 typically is not driven by the engine at a constant speed, but rather is constantly accelerating and decelerating about an average speed. The clutch 10 generally includes an internal torsional dampening device which reduces the magnitude of these speed irregularities. Unfortunately, because of inertia, the clutch brake 20 is subject to premature wear and failure as a result of these constant drive train torsional vibrations.

Thus, it is desirable to form the clutch brake 20 from a lightweight, yet relatively strong material in order to minimize the effects of inertia thereon. A die cast aluminum alloy, such as aluminum 380-3 material, has been found to be a desirable material for the clutch brake halves 21 and 22. However, other materials, such as plastic, may be used as well. By reducing the weight of the clutch brake 20, the magnitude of the torsional stresses induced therein as a result of the drive train torsional vibrations are significantly reduced. Consequently, the service life of the clutch brake 20 is extended. However, because they are subjected to relatively large torsional stresses applied to the clutch brake 20 when it is frictionally engaged between the release bearing 15 and the transmission bearing 13, the threaded fasteners 25 and 26 are preferably formed from hardened steel or similar high strength material.

Referring now to FIGS. 4 and 5, an alternate embodiment of a clutch brake 20' is illustrated in detail. The structure and operation of the clutch brake 20' is similar to the clutch brake 20 described above in connection with FIGS. 1 through 3, and like reference numerals are used to designate similar structures. The clutch brake 20' includes a pair of mating halves 21' and 22'. The halves 21' and 22' each have a plurality of axially extending apertures 30 and 31 formed through the outer peripheral portions thereof. Some apertures 30 are generally circular in cross section, while other apertures 31 are generally oval in cross section. The apertures 30 and 31 are aligned with similar apertures formed through the friction facings 23'. A plurality of axially extending recessed areas 32 are formed in the inner peripheral portions of the clutch brake halves 21' and 22'. The recessed areas 32 form regions of reduced thickness in the clutch brake 20', as best shown in FIG. 5.

As mentioned above, a die cast aluminum alloy has been found to be a desirable material for the clutch brake halves 21' and 22'. The apertures 30 and 31 and the recesses 32 are preferably formed during the die casting process, as opposed to being machined after the halves 21' and 22' have been formed. When formed in this manner, it has been found that the regions of the clutch brake 20' adjacent to the apertures 30 and 31 and adjacent to the recessed areas 32 are stronger than the other regions thereof. This strengthening is believed to result from increased density of the aluminum alloy material in those regions, apparently caused by the presence of the apertures 30 and 31 and the recessed areas 32 during the die casting process. Thus, although the apertures 30 and 31 and the recessed areas 32 further lower the weight, and therefore the inertia, of the clutch brake 20', no significant loss in strength has been experienced. The apertures 30 and 31 also provide increased surface cooling of the friction facings 23' by permitting the flow of air therethrough.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A clutch brake comprising:
   first and second halves, each of said halves including a first end having a circumferentially extending protrusion located near the outer circumferential edge thereof and a second end having a circumferentially extending protrusion located near the inner circumferential edge thereof, each of said protrusions having an aperture formed therethrough, said outer protrusions being disposed adjacent to said inner protrusions in circumferentially overlapping fashion such that said outer protrusion apertures are respectively aligned with said inner protrusion apertures;
   friction facing means attached to said first and second halves and adapted to be selectively frictionally engaged during use; and
   a pair of threaded fasteners extending radially inwardly through said aligned apertures to secure said halves together such that the radially innermost ends thereof are engageable with splines formed on a shaft upon which the clutch brake is to be mounted.

2. The invention defined in claim 1 wherein said apertures formed through said outer protrusions are non-threaded bores and said apertures formed through said inner protrusions are threaded so as to engage said threaded fasteners.

3. The invention defined in claim 1 further including an axially extending aperture formed through one of said first and second halves.

4. The invention defined in claim 3 wherein a plurality of said axially extending apertures are formed through an outer peripheral portion of each of said first and second halves.

5. The invention defined in claim 1 further including an axially extending recessed area formed in one of said first and second halves.

6. The invention defined in claim 5 wherein a plurality of said recessed areas are formed in an inner peripheral portion of each of said first and second halves.

7. The invention defined in claim 1 further including means formed in an outer peripheral surface of one of said first and second halves for positioning a tool therein to fracture said one of said first and second halves to remove the clutch brake from an enclosed shaft.

8. A clutch brake comprising:
first and second halves;
friction facing means attached to said first and second halves and adapted to be selectively frictionally engaged during use;
means for connecting said first and second halves together so as to enclose a shaft; and
means formed in an outer peripheral surface of one of said first and second halves for positioning a tool therein to fracture said one of said first and second halves to remove the clutch brake from the enclosed shaft.

9. The invention defined in claim 8 wherein each of said first and second halves includes a first end having a circumferentially extending protrusion located near the outer circumferential edge thereof and a second end having a circumferentially extending protrusion located near the inner circumferential edge thereof, each of said protrusions having an aperture formed therethrough, said outer protrusions being disposed adjacent to said inner protrusions in circumferentially overlapping fashion such that said outer protrusion apertures are respectively aligned with said inner protrusion apertures.

10. The invention defined in claim 9 further including a pair of threaded fasteners extending through said aligned apertures to secure said halves together.

11. The invention defined in claim 10 wherein said threaded fasteners extend radially inwardly through said overlapping outer and inner protrusions.

12. The invention defined in claim 11 wherein the radially innermost ends of said threaded fasteners extend through said inner protrusions so as to be engageable with splines formed on a shaft upon which the clutch brake is to be mounted.

13. The invention defined in claim 9 wherein said apertures formed through said outer protrusions are non-threaded bores and said apertures formed through said inner protrusions are threaded so as to engage said threaded fasteners.

14. The invention defined in claim 8 further including an axially extending aperture formed through one of said first and second halves.

15. The invention defined in claim 14 wherein a plurality of said apertures are formed through an outer peripheral portion of each of said first and second halves.

16. The invention defined in claim 8 further including an axially extending recessed area formed in one of said first and second halves.

17. The invention defined in claim 16 wherein a plurality of said recessed areas are formed in an inner peripheral portion of each of said first and second halves.

18. A clutch brake comprising:
first and second halves, each of said halves including a first end having a circumferentially extending protrusion located near the outer circumferential edge thereof and a second end having a circumferentially extending protrusion located near the inner circumferential edge thereof, each of said protrusions having an aperture formed therethrough, said outer protrusions being disposed adjacent to said inner protrusions in circumferentially overlapping fashion such that said outer protrusion apertures are respectively aligned with said inner protrusion apertures;
a pair of threaded fasteners extending through said aligned apertures to secure said halves together;
friction facing means attached to said first and second halves and adapted to be selectively frictionally engaged during use; and
an axially extending aperture formed through one of said first and second halves and through said friction facing means attached thereto.

19. The invention defined in claim 18 wherein a plurality of said axially extending apertures are formed through an outer peripheral portion of each of said first and second halves.

20. The invention defined in claim 18 wherein said threaded fasteners extend radially inwardly through said overlapping outer and inner protrusions.

21. The invention defined in claim 20 wherein the radially innermost ends of said threaded fasteners extend through said inner protrusions so as to be engageable with splines formed on a shaft upon which the clutch brake is to be mounted.

22. The invention defined in claim 18 wherein said apertures formed through said outer protrusions are non-threaded bores and said apertures formed through said inner protrusions are threaded so as to engage said threaded fasteners.

23. The invention defined in claim 18 further including an axially extending recessed area formed in one of said first and second halves.

24. The invention defined in claim 23 wherein a plurality of said recessed areas are formed in an inner peripheral portion of each of said first and second halves.

25. The invention defined in claim 18 further including means formed in an outer peripheral surface of one of said first and second halves for positioning a tool therein to fracture said one of said first and second halves to remove the clutch brake from an enclosed shaft.

26. A clutch brake comprising:
first and second halves, each of said halves including a first end having a circumferentially extending protrusion located near the outer circumferential edge thereof and a second end having a circumferentially extending protrusion located near the inner circumferential edge thereof, each of said protrusions having an aperture formed therethrough, said outer protrusions being disposed adjacent to said inner protrusions in circumferentially overlapping fashion such that said outer protrusion apertures are respectively aligned with said inner protrusion apertures;
a pair of threaded fasteners extending through said aligned apertures to secure said halves together;
friction facing means attached to said first and second halves and adapted to be selectively frictionally engaged during use;
an axially extending recessed area formed in an axially facing surface of said first and second halves.

27. The invention defined in claim 26 wherein a plurality of said axially extending recessed areas are formed in an inner peripheral portion of each of said first and second halves.

28. The invention defined in claim 26 wherein said threaded fasteners extend radially inwardly through said overlapping outer and inner protrusions.

29. The invention defined in claim 28 wherein the radially innermost ends of said threaded fasteners extend through said inner protrusions so as to be engageable with splines formed on a shaft upon which the clutch brake is to be mounted.

30. The invention defined in claim 26 wherein said apertures formed through said outer protrusions are non-threaded bores and said apertures formed through said inner protrusions are threaded so as to engage said threaded fasteners.

31. The invention defined in claim 26 further including an axially extending aperture formed through one of said first and second halves and through said friction facing means attached thereto.

32. The invention defined in claim 31 wherein a plurality of said axially extending apertures are formed through an outer peripheral portion of each of said first and second halves.

* * * * *

UNITED STATES PATENT AND TRADEMARK OFFICE
CERTIFICATE OF CORRECTION

PATENT NO. : 5,031,739

DATED : July 16, 1991

INVENTOR(S) : Richard A. Flotow et al.

It is certified that error appears in the above-identified patent and that said Letters Patent is hereby corrected as shown below:

Column 7, line 47    after "said" insert -- axially extending -- .

Column 8, line 58,    after "of" insert -- one of -- .

Signed and Sealed this

First Day of December, 1992

*Attest:*

DOUGLAS B. COMER

*Attesting Officer*    *Acting Commissioner of Patents and Trademarks*